United States Patent Office 3,778,514
Patented Dec. 11, 1973

3,778,514
NUTRITIONAL PRODUCT OF WHEY PROTEIN AND COLLAGEN HYDROLYSATE
Floyd C. Olson, Madison, Wis., assignor to Oscar Mayer & Co. Inc., Madison, Wis.
No Drawing. Filed Oct. 9, 1970, Ser. No. 79,674
Int. Cl. A23k 1/00, 1/08
U.S. Cl. 426—61                6 Claims

ABSTRACT OF THE DISCLOSURE

Food product comprising whey protein and protein hydrolysate from steam rendering of fats has attractive amno acid profile. Other proteins can be added to further improve the amino acid profile to round out nutritional value; fats or oil can be added to provide a milk-substitute calf food.

---

Whey production in the United States for 1966 was 1.3 billion pounds of whey solids. Approximately half of this was used as dried whey, condensed whey and lactose separated from whey. Approximately 600 million pounds of whey solids were a disposal problem. The principal cost of whey is the cost of collection.

Another potentially cheap source of protein is tank water—an aqueous liquid from steam rendering of fat which includes a soluble protein material. This soluble protein is a heat hydrolysate of collagen coming from skin and fat cells. After lard is drawn off, and tank water is screened, the screened tank water is concentrated, for example, in a triple effect evaporator, to 60–70% solids. This concentrate is known as "stick." Very few plants have wet rendering facilities so "stick' may be considered to be generally unavailable at the present time. However, it has been estimated that for the entire pork industry, there should be 500 million pounds of collagen available per year (dry solids basis). If economic considerations were attractive enough, it could be steam processed for utilization.

Hydrolysate of collagen produced from steam rendering of fat is notably deficient in tryptophan, threonine, methionine plus cystine and isoleucine. On the other hand, whey protein supplies generous amounts of these amino acids. In accordance with this invention equal amounts of whey protein and peptone protein would appear to give an amino acid profile similar to cow's milk.

About half the world has an inadequate supply of protein. In past years certain protein-rich nations have given millions of pounds of non-fat dry milk to less fortunate countries. In most recent years, however, non-fat dry milk has become less of a surplus in the protein-rich countries. The price for the non-fat dry milk solids has increased steadily almost two-fold. A low cost product of good protein nutritive value is desirable, particularly for malnourished persons throughout the world.

Such a product, however, would also be potentially useful in protein-rich countries for human food directly. It would also be useful as an animal food, e.g., a calf food. As an animal food such a product can be used for the purpose of upgrading a relatively inexpensive protein to a more expensive proten product, namely meat.

It is an object of this invention to provide a mixture of the aforementioned, inexpensive materials in order to provide a product having improved organoleptic rating, and which provides a readily assimilable source of protein nutrition. It is a further object of this invention to provde a method of providing such a product for low cost to provide an actual advance in the nutrition art even though the resulting product may include relatively low quality protein. It is a further object of this invention to provide a mixture including one or more materials, which, in their respective individual forms exhibit relatively unsuitable organoleptic qualities for human nutritional purposes, but which in admixture with other materials in accordance with this invention do exhibit suitable organoleptic attributes, thus making available in an acceptable form, at very low cost, large quantites of nutritional protein values which may otherwise not have been utilized in this manner.

These and other objects which will be apparent hereinafter are achieved, in accordance with this invention by providing a product comprising an admixture of whey protein, said whey protein being present in an amount between 10 and 95% by weight of the protein, and water-soluble collagen-derived protein, said collagen-derived protein being present in said mixture in an amount between 5% and 40%, preferably between 5% and 20%, based on the weight of the protein in the product.

In a preferred embodiment of this invention intended for use as human food with high nutritive value of protein, the product contains, in addition to whey and collagen hydrolysate, one or more of the following optional ingredients: soy bean flour, sesame flour, cottonseed flour, debittered brewers' yeast, wheat germ, Torula yeast, yeast grown on petroleum paraffins, bacteria grown on petroleum paraffins, vegetable oils, animal fats, or any mixture of the aforementioned ingredients.

In another preferred embodiment of this invention, which embodiment is intended for use as a calf food, for example, in additon to whey and collagen hydrolysate protein, the product contains grease or tallow in an amount sufficient to provide a fat content of 20 to 50%, preferably 30 to 40% based on the weight of the product.

Preferred embodiments of this invention are illustrated in the following numbered examples in which all percents (%) are expressed as percent by weight, all parts are expressed in parts by weight, and all temperatures are expressed in degrees Fahrenheit.

EXAMPLE 1

Imitation milk product, ingredients:

| | Lbs. |
|---|---|
| Lactose reduced whey concentrate (40% solids) | 90 |
| Collagen hydrolysate (40% solids) | 10 |
| | 100 |

Whey concentrate is prepared in a conventional method by low temperature concentration of centrifuged cheddar cheese whey to 35–40% solids. It is cooled to 40° F. and permitted to stand. Lactose crystallizes in the standing liquor and is separated by centrifuging. The effluent is adjusted to 40% solids to provide the lactose-reduced whey concentrate for use as an ingredient in this example.

The collagen hydrolysate ingredient is prepared in accordance with the following procedure: U.S.D.A. inspected and passed edible fatty connective tissue is used as a starting material. This material includes fatty trimmings with and without attached skin. The material is placed in a pressure vessel and heated by direct injection of steam at 265° F. for 2.5 hours. The contents of the vessel are then permitted to settle for 1.5 hours. A rendered fat layer accumulates at the top and is drawn off separately. The lower aqueous phase is separated, filtered, and concentrated. The resulting material is approximately 49.2% protein (dry solids basis) and is eminently satisfactory for use in accordance with this invention. The amino nitrogen in the concentrate is between 4 and 8% of the total nitrogen present.

Whey concentrate and the collagen hydrolysate produced in accordance with the above-described procedures are thoroughly mixed. The mixture is heated to 130° F., pasteurized by high temperature, short time treatment, and spray dried. The product analysis (product basis) was as follows:

| | Percent |
|---|---|
| Protein | 33.6 |
| Lactose | 42.0 |
| Ash | 19.1 |
| Moisture | 4.2 |

The resulting nutritious protein product provides an amino acid profile between that of soybean meal and casein. The thiamine, riboflavin, niacin and pantothenic acid and vitamin $B_{12}$ are believed to be double the level observed in milk.

EXAMPLE 2

Protein additive, ingredients:

| | Lbs. |
|---|---|
| Whey protein concentrate (40% solids, 18% protein) | 70 |
| Collagen hydrolysate (40% solids, 36% protein) | 10 |
| Soy flour (8% moisture, 47% protein) | 20 |
| Water | 50 |

The above ingredients were thoroughly mixed and spray dried. The yield was 52.5 lbs. The resulting product was dispersible in water although not soluble. The protein content was 48.7% and was of good nutritive value. The resulting product was high in vitamin B complex. It can be used as a nutritive additive to wheat or corn flour to increase the protein value of native bread in foreign countries. It can also be used as an imitation milk.

EXAMPLE 3

Fat component for calf food, ingredients:

| | lbs. |
|---|---|
| Whey from cheddar cheese (conc. to 40% solids) | 160 |
| Collagen hydrolysate (40% solids, 36% protein) | 10 |
| Choice white grease | 35 |
| Emulsifier | 0.3 |

The whey concentrate, collagen hydrolysate and emulsifier were mixed and warmed to 135–140° F. The choice white grease, warmed to 135–140°, was mixed in and the mixture was run through a homogenizer to emulsify the fat. The emulsion was pumped through a high temperature short time pasteurizer and then spray dried.

Composition of dry product:

| | Percent |
|---|---|
| Moisture | 4 |
| Protein | 11.6 |
| Fat | 35 |
| Lactose | 44 |
| Ash | 5 |

This product, when mixed with other materials, will also add a suitable fat product to a calf food.

The hydrolysate of collagen which is used as an ingredient in Examples 2 and 3 were prepared in accordance with the procedure described in Example 1. The preferred hydrolysate of collagen used in accordance with the present invention is the water-soluble, low free-amino acid, non-gelling hydrolysate of collagen described in, and produced in accordance with methods set forth in copending U.S. patent application Ser. No. 289,117, assigned to a common assignee, which application was filed on Sept. 14, 1972, Floyd C. Olson, and Jack C. Trautman, inventors, and titled Hydrolysate of Collagen as a Sausage Ingredient and the disclosure of that application is incorporated herein by reference thereto. However, as used herein the term "hydrolysate of collagen" is intended to include water-soluble nitrogenous materials produced by the steam lard rendering. For example, lard tankwater, "stick," and high protein level concentrates are contemplated for use in accordance with this invention.

As used herein the term "whey protein" is intended to include undenatured whey protein both in water soluble form, and in precipitated form, e.g., precipitated by polyphosphate addition. Whey protein in undenatured precipitated form can be solubilized by neutralizing with sodium hydroxide, calcium hydroxide or the like, and the resulting material is intended to be included within the meaning of the term "whey protein" as it is used herein.

It is contemplated that a high protein content whey concentrate, obtained by crystallizing and separating lactose from a concentrated whey, can be used in accordance with this invention. Also concentration of whey by ultrafiltration reverse osmosis and by sephadex column treatment is also useful.

As illustrated in the examples, it is also useful that the protein content of the whey-collagen hydrolysate mixture of this invention can be increased by addition of appropriate vegetable protein concentrates thereto. For example, soy flour can be used. This combination's first deficiency would be in methionine plus cystine, but otherwise, the mixture would be equivalent to cow's milk.

Also, wheat germ is considered to be a good vegetable protein, and, in accordance with this invention, it can be combined with the whey-collagen hydrolysate mixture of this invention to provide a nutritional mixture whose first deficiency would probably be isoleucine.

It is further contemplated that the whey-collagen hydrolysate mixture of this invention can be combined with sesame flour. Sesame protein is generally known to provide rather high methionine plus cystine but a low lysine content. The whey, collagen hydrolysate, sesame protein combination would provide a high nutritive value of protein.

The protein content of some yeasts is about 45%, and this protein has good nutritive value. Although brewers' yeast is rather bitter, it can be debittered. Yeast grown from waste products of wood pulping, e.g., Torula yeast, also provides high nutritive value protein. Debittered brewers' yeast, or Torula yeast are contemplated for use in the whey-collagen-hydrolysate combination of this invention to give a protein amino acid profile which is believed to be equivalent to cow's milk.

Also, in recent years, other micro-organisms grown on paraffin and the like have been investigated as a source of protein. It is contemplated that a combination of yeast amino acids derived from petroleum-fed micro-organisms could supplement the whey-collagen hydrolysate mixture of this invention to provide an adequate protein combination similar to cow's milk. For example the proteins of mixed cells of *Brevibacterium insectiphilium* and *Pseudomonas orvilla* (1:2) as reported in Esso Pat. 3,308,035 can also be used as a mixed protein combination of high nutritive value as a supplement for the whey-collagen hydrolysate mixture of this invention. It is apparent that combinations which appear to be particularly deficient in one essential amino acid or another can be greatly improved in nutritional value by addition of concentrate containing high levels of the particular amino acid, in accordance with this invention.

It is contemplated that this invention is applicable to materials having protein levels ranging from virtually all protein concentrates (e.g., 95% and higher) to food products having relatively low protein levels, e.g., 3% protein.

I claim:

1. A nutrition product having an attractive amino acid profile comprising: an admixture of concentrated whey protein present in the admixture in an amount between 10 and 95% by weight based on the weight of protein in the admixture, and water-soluble low free amino acid non-gelling hydrolyzate of collagen in which the amino nitrogen content of the hydrolyzate is less than 8% by weight based on the weight of the total nitrogen present, said hydrolyzate of collagen being present in said admixture in an amount between 5 and 40% based on the weight of the protein in the admixture.

2. The product of claim 1 in which said hydrolyzate of collagen is present in an amount between 5 and 20%.

3. A nutrition product having an attractive amino acid profile comprising an admixture of concentrated whey protein and water-soluble non-gelling hydrolyzate of collagen in which the amino nitrogen content of the hydrolyzate is less than 8% by weight based on the weight of the total nitrogen present, said whey protein being present in an amount between 10 and 95% based on the weight of protein in the admixture, said water-soluble hydrolyzate of collagen being derived from steam rendering of lard, and being present in said admixture in an amount between 5 and 20% based on the weight of the protein in the admixture.

4. The nutritional product of claim 1, in which said whey protein is present in an amount between 10 and 30% based on the weight of the product, and said hydrolyzate of collagen is present in an amount between 3 and 15% based on the weight of the product, said product also comprising a member selected from the group consisting of soy bean flour, sesame flour, cottonseed flour, debittered brewers' yeast, wheat germ, Torula yeast, yeast grown on petroleum paraffin, bacteria grown on petroleum paraffin, vegetable oil, animal fat, and mixtures thereof.

5. A method of manufacturing a calf food component comprising the steps: admixing concentrated whey in an amount between 30 and 60% by weight based on the weight of the calf food component, with water soluble non-gelling hydrolysate of collagen derived from steam rendering of lard in which the amino nitrogen content of the hydrolyzate is less than 8% by weight based on the weight of the nitrogen present, said hydrolyzate of collagen having a protein level between 2 and 20% based on the weight of the hydrolyzate; and also admixing with said whey and said hydrolyzate a fluid member selected from the group consisting of animal fat, vegetable oil, and mixtures thereof, said member being in an amount between 20 and 50% by weight based on the weight of the product, said concentrated whey, said hydrolysate of collagen and said member being at approximately the same temperature during said admixing.

6. A calf food component comprising an admixture of concentrated whey in an amount between 30 and 60% by weight based on the weight of the component, water soluble non-gelling hydrolyzate of collagen in an amount between 2 and 20% by weight based on the weight of the component in which the amino nitrogen content of the hydrolyzate is less than 8% by weight based on the weight of the nitrogen present, said whey providing between 10 and 95% of the protein in the component, said hydrolyzate providing between 5 and 40% of the protein in the component, said component including a member selected from the groups consisting of animal fat, vegetable oil, and mixtures thereof, said member being in an amount between 20 and 50% by weight based on the weight of the component.

References Cited

UNITED STATES PATENTS

| | | | |
|---|---|---|---|
| 3,080,234 | 3/1963 | Jarowski | 99—14 |
| 2,344,229 | 3/1944 | Block | 99—2 |
| 2,708,630 | 5/1955 | Davis | 99—7 |
| 3,397,991 | 8/1968 | Johnson | 99—17 |

FOREIGN PATENTS

| | | | |
|---|---|---|---|
| 489,111 | 1952 | Canada | 99—19 X |

RAYMOND N. JONES, Primary Examiner

U.S. Cl. X.R.

426—185, 210, 212

UNITED STATES PATENT OFFICE
CERTIFICATE OF CORRECTION

Patent No. 3,778,514　　　　　　　　Dated December 11, 1973

Inventor(s) Floyd C. Olson

It is certified that error appears in the above-identified patent and that said Letters Patent are hereby corrected as shown below:

Column 1, line 14, "amno" should be --amino--.

Column 1, line 61, "proten" should be --protein--.

Column 1, line 67, "provde" should be --provide--.
Column 4, line 13, delete "useful" and insert --contemplated--.
Column 4, line 63, "an attractive" should be replaced by
   --a desired--.

Column 5, line 1, "an attractive" should be replaced by
   --a desired--.

Column 5, line 3, after the word "water-soluble" there
   should be added "low free amino acid".

Column 5, line 27, before the word "non-gelling" there
   should be added "low free amino acid".

Column 6, line 9, before the word "non-gelling" there
   should be added "low free amino acid".

Signed and sealed this 10th day of September 1974.

(SEAL)
Attest:

McCOY M. GIBSON, JR.　　　　　　　　C. MARSHALL DANN
Attesting Officer　　　　　　　　　　Commissioner of Patents